(12) United States Patent
Clark et al.

(10) Patent No.: US 7,991,741 B2
(45) Date of Patent: Aug. 2, 2011

(54) SYSTEM AND METHOD FOR SYNCHRONIZING DATA RECORD WITH WEB DOCUMENT IN A CONTENT MANAGEMENT SYSTEM

(75) Inventors: David John Clark, Warwick (GB); Peter Y. Hsu, Austin, TX (US); Scott Anthony Morgan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 12/062,566

(22) Filed: Apr. 4, 2008

(65) Prior Publication Data

US 2009/0254520 A1    Oct. 8, 2009

(51) Int. Cl.
    *G06F 17/30*      (2006.01)
(52) U.S. Cl. ...................................................... 707/638
(58) Field of Classification Search .................. 707/610, 707/624, 627, 613, 618, 638, 620
See application file for complete search history.

(56) References Cited

U.S. PATENT DOCUMENTS

| | | | | |
|---|---|---|---|---|
| 6,061,686 | A * | 5/2000 | Gauvin et al. | 707/624 |
| 6,851,089 | B1 * | 2/2005 | Erickson et al. | 715/255 |
| 7,240,077 | B1 * | 7/2007 | Edelman et al. | 1/1 |
| 2005/0160355 | A1 | 7/2005 | Cragun et al. | |
| 2007/0174419 | A1 * | 7/2007 | O'Connell et al. | 709/217 |
| 2007/0180075 | A1 | 8/2007 | Chasman et al. | |
| 2007/0192797 | A1 | 8/2007 | Kang et al. | |
| 2008/0250034 | A1 * | 10/2008 | Petri | 707/100 |

OTHER PUBLICATIONS

Ellis, JDBC 3.0 Specification, Oct. 2001, pp. 1-190.*
Open Source Development with CVS, 3rd Edition, 2000, pp. 1-147.*

* cited by examiner

*Primary Examiner* — James Trujillo
*Assistant Examiner* — Albert Phillips
(74) *Attorney, Agent, or Firm* — Schmeiser, Olsen & Watts; Yuanmin Cai

(57) ABSTRACT

A system and associated method for synchronizing a record with a web document. A synchronizer selects a web document that is stored in a published web document repository of a content management system. The oldest web document since the latest update is selected and checked for availability. The synchronizer locates a record that corresponds to the selected web document. The synchronizer then checks respective version of the web document and the record to determine whether the record correctly represents the web document. The synchronizer then verifies whether the selected web document is available to users to avoid synchronizing latent web document that is not available to users. The synchronizer updates the located record.

20 Claims, 3 Drawing Sheets

SYSTEM AND METHOD FOR SYNCHRONIZING DATA RECORD WITH WEB DOCUMENT IN A CONTENT MANAGEMENT SYSTEM

FIELD OF THE INVENTION

The present invention discloses a system and associated method for supporting seamless Web 2.0 features in conventional content management systems to provide interactive web services to users of web content.

BACKGROUND OF THE INVENTION

Conventional content management systems are widely deployed but may lack functionalities to support highly interactive features on Internet platforms emerging with Web 2.0 technology trend. To provide Web 2.0 services to users of web document, web sites employ separate data repositories to hold records, which have to be synchronized with corresponding web document stored in conventional content management systems. However, due to complex workflow of conventional content management system, Web 2.0 records may not be timely and efficiently synchronized with web document in a conventional content management system.

Thus, there is a need for a system and associated method that overcomes at least one of the preceding disadvantages of current methods and systems of synchronizing data repository records with web documents in a content management system.

SUMMARY OF THE INVENTION

The present invention provides a method for synchronizing at least one record stored in a data repository with at least one web document stored in a repository, the method comprising:

selecting a web document of said at least one web document in the repository;

subsequent to said selecting, locating, in the data repository, a record of said at least one record that corresponds to the web document;

subsequent to said locating, determining that the record does not correctly represent the web document;

subsequent to said determining, verifying that the web document is actively serviced to web users; and subsequent to said verifying, updating the record such that the record in the data repository correctly represents the web document in the repository, wherein said selecting, said locating, said determining, said verifying and said updating are performed by a synchronizer.

The present invention provides a computer program product, comprising a computer usable storage medium having a computer readable program code embodied therein, said computer readable program code containing instructions that when executed by a processor of a computer system implement a method for synchronizing at least one record stored in a data repository with at least one web document stored in a repository, the method comprising:

selecting a web document of said at least one web document in the repository;

subsequent to said selecting, locating, in the data repository, a record of said at least one record that corresponds to the web document;

subsequent to said locating, determining that the record does not correctly represent the web document;

subsequent to said determining, verifying that the web document is actively serviced to web users; and subsequent to said verifying, updating the record such that the record in the data repository correctly represents the web document in the repository, wherein said selecting, said locating, said determining, said verifying and said updating are performed by a synchronizer.

The present invention provides a computer system comprising a processor and a computer readable memory unit coupled to the processor, said memory unit containing instructions that when executed by the processor implement a method for synchronizing at least one record stored in a data repository with at least one web document stored in a repository, the method comprising:

selecting a web document of said at least one web document in the repository;

subsequent to said selecting, locating, in the data repository, a record of said at least one record that corresponds to the web document;

subsequent to said locating, determining that the record does not correctly represent the web document;

subsequent to said determining, verifying that the web document is actively serviced to web users; and subsequent to said verifying, updating the record such that the record in the data repository correctly represents the web document in the repository, wherein said selecting, said locating, said determining, said verifying and said updating are performed by a synchronizer.

The present invention provides a method and system that overcomes at least one of the current disadvantages of conventional method and system for synchronizing a record with a web document in a content management system.

DETAILED DESCRIPTION OF THE INVENTION

Figure 1:
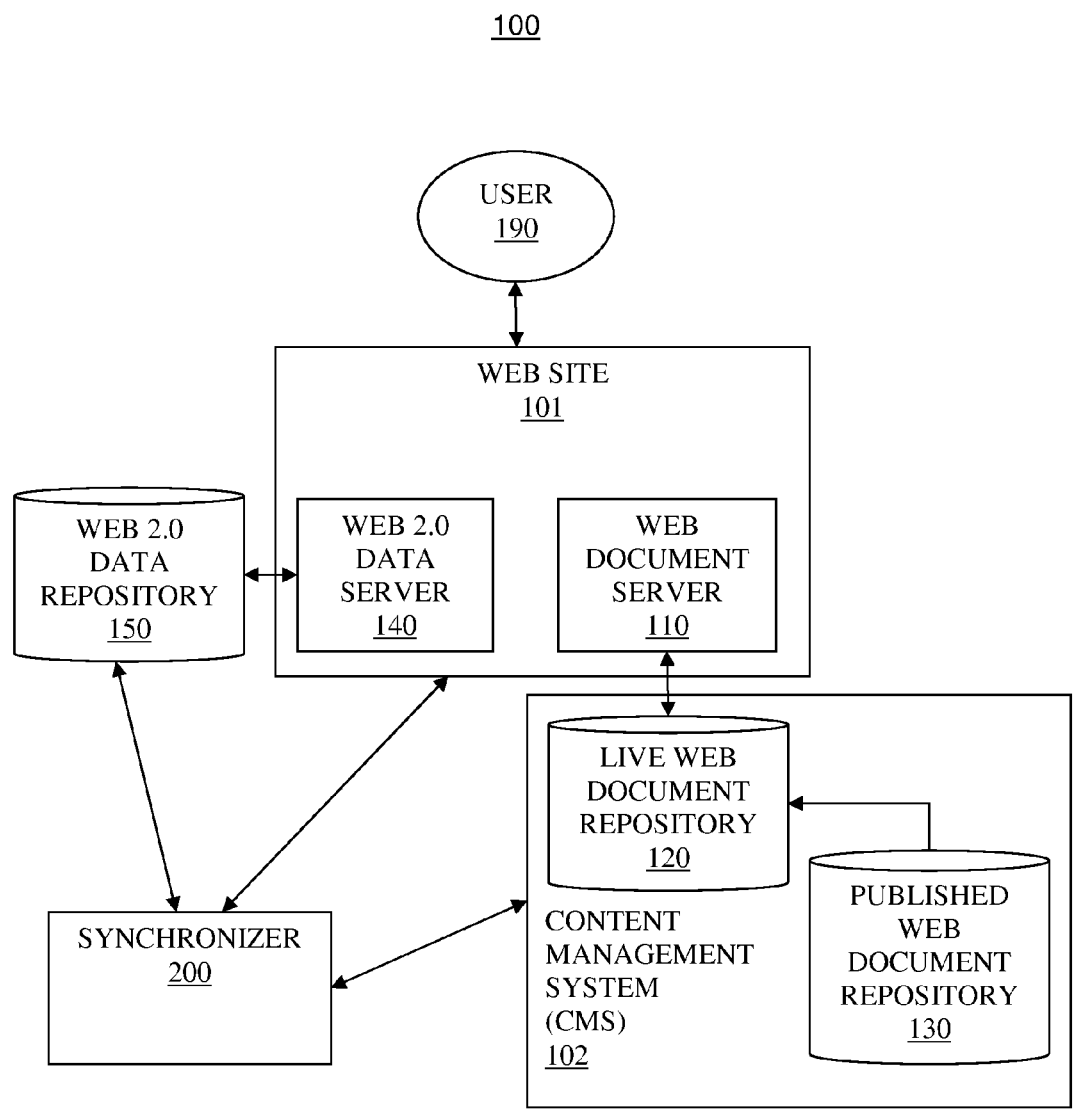
FIG. 1 illustrates a system 100 for synchronizing a data repository with a content management system, in accordance with embodiments of the present invention.

FIG. 1 illustrates a system 100 for synchronizing a data repository with a content management system, in accordance with embodiments of the present invention. The system 100 of the present invention comprises a web site 101, a content management system 102, a Web 2.0 data repository 150, and a synchronizer 200.

The web site 101 comprises a Web 2.0 data server 140 and a web document server 110. The system 100 provides Web 2.0 services with the Web 2.0 data server 140 and records stored in the Web 2.0 data repository 150 for web documents service by the web document server 110.

The content management system (CMS) 102 controls usage of web documents stored in a live web document repository 120 and a published web document repository 130. Web documents stored in the live web document repository 120 are available to a user 190 of the web site 101. A published web document that is stored in the published web document repository 130 may be available to the user 190 as being transferred to the live web document repository 120, or may not be available to the user 190 pending further processing required by workflows of the CMS 102. In one embodiment of the present invention, the content management system 102 is implemented with IBM® Lotus® Domino® (IBM, Lotus and Domino are trademarks of International Business Machines Corporation in the United States, other countries, or both). In this specification, a web document broadly refers to the content in any format that is serviced by the content management system 102, including but not limited to, web documents in Hypertext Transport Protocol (HTTP) format, computer program files, audio and/or video media files, and electronic documents, etc.

The web document server 110 services web documents stored in the live web document repository 120 to the user 190 of the web site 101. In one embodiment of the present invention, the web document server is implemented with Java2 Enterprise Edition (J2EE®) and operates on IBM WebSphere® Application Server platform. (Java and all Java-based trademarks are trademarks of Sun Microsystems, Inc. in the United States, other countries, or both. WebSphere is a trademark of International Business Machines Corporation in the United States, other countries, or both).

The live web document repository 120 stores a live web document that is available to the user 190 who accesses the web site 101. The web document server 110 and the live web documents repository 120 are deployed in a controlled environment to provide appropriate security, availability and maintainability, and are protected by a firewall. In other embodiments, the document in the published web documents repository 130 become the live web documents repository 120 subject to final preview stages in the workflow of the CMS 102. The combination of the scheduled processes, the controlled environment and firewall, and any additional workflow stages lead to a considerable latency between a stage that a document is stored into the published web documents repository 130 and a stage that the document becomes available in web-ready form in the live web documents repository 120. In one preferred embodiment that incorporates a very large document library, this latency can be several hours.

A published web document repository 130 stores a published web document. The published web document becomes the live web document when the published web document is stored to the live web document repository 120 according to the workflow of the CMS 102. Depending on a scale and scheduled processes in a workflow of the CMS 102, a delay from the time when the web document is published to the time when the web document becomes live may vary and raises issues regarding a synchronization of records with web documents.

The Web 2.0 data server 140 provides Web 2.0 services for the web site 101 using a record stored in the Web 2.0 data repository 150. Examples of Web 2.0 services may include, inter alia, hit counts, tag clouds using font size to represent tag frequency, and advanced searching by various categorisations of the documents.

In one embodiment, the Web 2.0 data repository 150 is implemented with IBM DB2® Universal Data repository (DB2 is a trademark of International Business Machines Corporation in the United States, other countries, or both). Web 2.0 services refer to highly interactive and collaborative web services such as wikis, web logging (blogging), and collaborative tagging, etc. Examples of functionalities required in Web 2.0 services may include, inter alia, counting number of hits, tagging, commenting in and/or rating of web content, rich Asynchronous JavaScript and XML (AJAX) based Internet application techniques such as advanced search functions within a webpage, etc.

The record in the Web 2.0 data repository 150 corresponds to the published web document and/or the live web document. The record comprises annotation data for Web 2.0 services, selected fields and/or properties of the published web document that support Web 2.0 services. The record replicates a subset of structured fields for web documents from the published web documents repository 130 and supplements the replicated fields with additional fields to record hit counts, tag usage, etc. As web documents in the published web document repository 130 and the live web document repository 120 are created, published, deleted, archived, edited, and/or updated in the CMS 102, all the changes must be reflected in the Web 2.0 data repository 150. However, as mentioned above, the record corresponding to the published web document does not correctly represent the live web document until the published web document becomes the live web document. Consequently, the record in the Web 2.0 data repository 150 must be in synchronization with the live web document in the live web document repository 120 to provide Web 2.0 service to the user 190 accessing the live web document.

The synchronizer 200 repeatedly performs synchronizations of the Web 2.0 data repository 150 with live web documents of the CMS 102. See descriptions of FIG. 2 below for details. As mentioned above, a record corresponding to a web document may not represent the latest version of the web document. Also, the latest web document may not be available to users yet due to workflow of the CMS, thus, synchronizing the corresponding record with the web document should be delayed until the latest web document becomes live. The synchronizer resolves both problems in synchronizing records with web documents in the CMS by versioning updates of web documents and replicating only live web documents.

Figure 2:
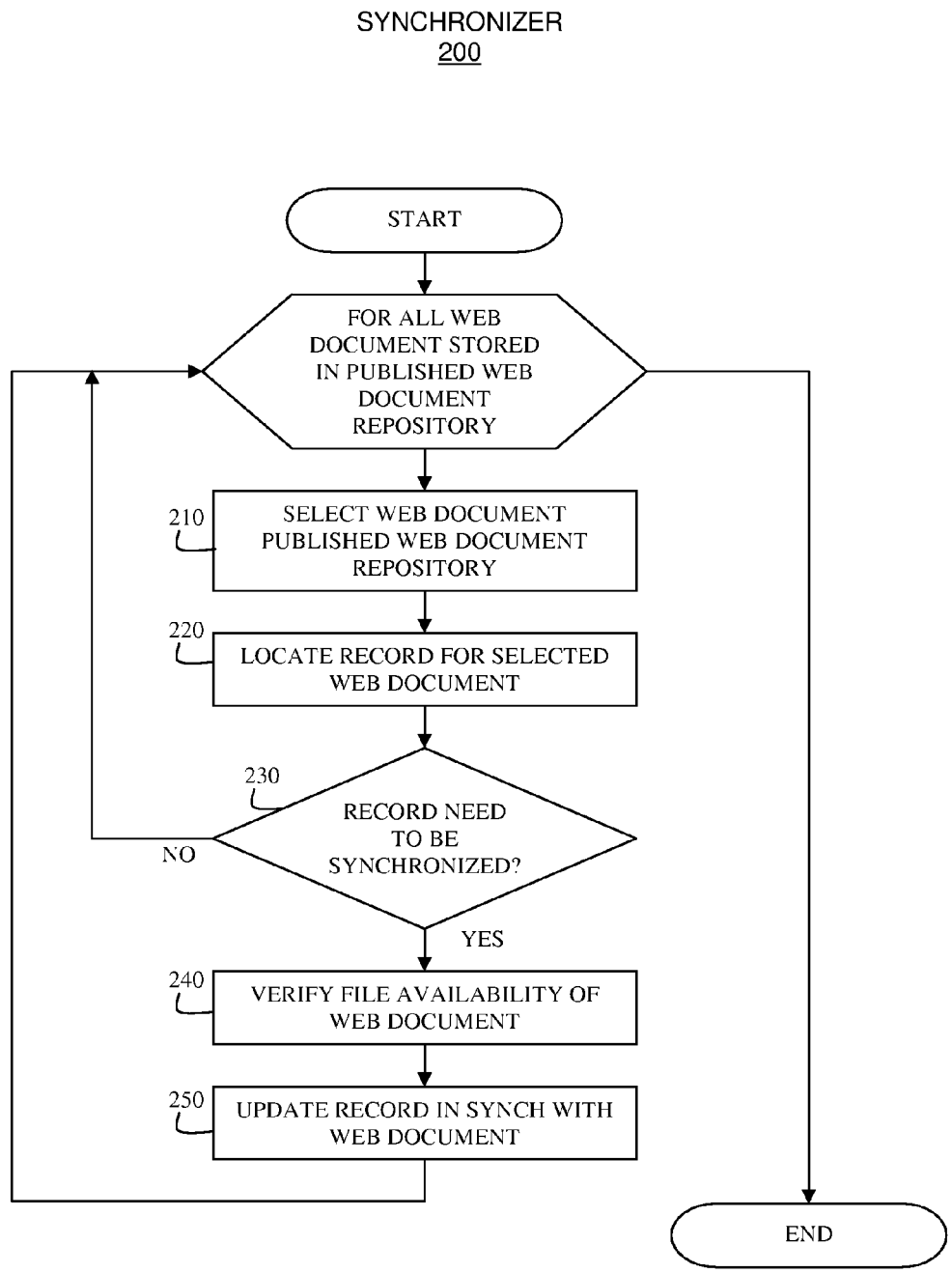
FIG. 2 is a flowchart depicting a method for synchronizing the data repository with the content management system of FIG. 1, supra, in accordance with the embodiments of the present invention.

FIG. 2 is a flowchart depicting a method for synchronizing the data repository with the content management system of FIG. 1, supra, in accordance with the embodiments of the present invention. The method is performed by the synchronizer of FIG. 1, supra.

In step 210, the synchronizer selects a published web document to be synchronized from the published web document repository. The synchronizer selects the published web document that has been least recently updated out of all published web documents in the published web document repository because the longer a duration of a web document has been updated, it is more probable that the web document requires a corresponding record in the data repository to reflect the update.

In step 220, the synchronizer locates, from the data repository, a record that corresponds to the published web document that was selected in step 210. If the synchronizer cannot locate the record corresponding to the selected published web document, then the synchronizer proceeds with step 240 regarding that the selected published web document is newly published and needs to be synchronized with the data repository. Proceeding directly to step 240 with no located record is equivalent to locating a null record and proceeding with step 230.

In one embodiment of the present invention, both a web document and a record that is located as corresponding to the web document have a same syndication key that indicates such correspondence between the web document and the record. In the same embodiment, the synchronizer prepares a list of published web documents stored in the published web document repository and a list of records stored in the data repository prior to performing steps 210 and 220. In this embodiment, the synchronizer periodically connects to the published web document repository via Hypertext Transport Protocol (HTTP) connection and retrieves a list of syndication keys and version keys of each web document. The synchronizer also connects to the Web 2.0 data repository via Java Data repository Connectivity (JDBC) application programming interfaces (APIs) and obtains a list of syndication keys and version keys of each record.

The list of published web documents comprises a syndication key and a version key of each published web document. The list of records also comprises the syndication key and the version key of each record. The syndication key is assigned when a web document is created. The web document and a record corresponding to the web document shares an identical syndication key. The version key represents a version number of the web document and/or the record, and is modified when the web document and/or the record is updated. If the corresponding record also has a same version key as the published web document, the corresponding record is regarded as up-to-date with the published web document.

The list of published web document may be configured such that the synchronizer accesses web documents in a descending order of duration since last update, i.e., oldest-first. Consequently, in step 210, the synchronizer selects an oldest published web document first for synchronization from the list. Assuming web documents become available in an order of their updates, the synchronizer needs not examine remaining web documents in the list after the synchronizer accessed the first web document that has been updated for the longest time but is not available yet. In one embodiment of the present invention, an availability flag is employed to mark the oldest but not available web document in the list. Once the synchronizer set the availability flag with a negative value for a web document, the synchronizer stops checking for synchronization of remaining web documents in the list positioned after the web document.

In step 230, the synchronizer determines whether the record correctly represents the published web document by comparing the version key of the published web document and the version key of the record. If the version key of the published web document matches the version key of the record version keys indicating that the record correctly represents the published web document, then the synchronizer terminates synchronizing the record. If the version key of the record is different from the version key of the published web document indicating that the record is not up-to-date, then the synchronizer proceeds with step 240.

In step 240, the synchronizer verifies whether the published web document is a live web document that is available to users by checking version key of the live web document stored in the live web document repository that corresponds to the published web document. If the synchronizer discovers that the published web document is not available to users yet, the synchronizer terminates synchronizing the record with the published web document. If the synchronizer successfully verifies that the published web document is available to users, then the synchronizer proceeds with step 250.

In step 250, the synchronizer updates the record in the data repository to match the live web document.

The synchronizer repeats steps 210, 220, 230, 240, and 250 for all web documents stored in the published web document repository. In one embodiment, a synchronization period is one (1) minute. In another embodiment, the synchronizer may receive a direct notification for a new synchronization cycle from the published web document repository rather than periodically checking repositories and the data repository for an updated web documents and records to be synchronized. After the synchronizer performs steps 210, 220, 230, 240, and 250 for all web documents in the published web document repository, any unmatched record in the Web 2.0 data repository indicates that such record has no corresponding published web document and should be removed from or deactivated within the Web 2.0 data repository.

Figure 3:
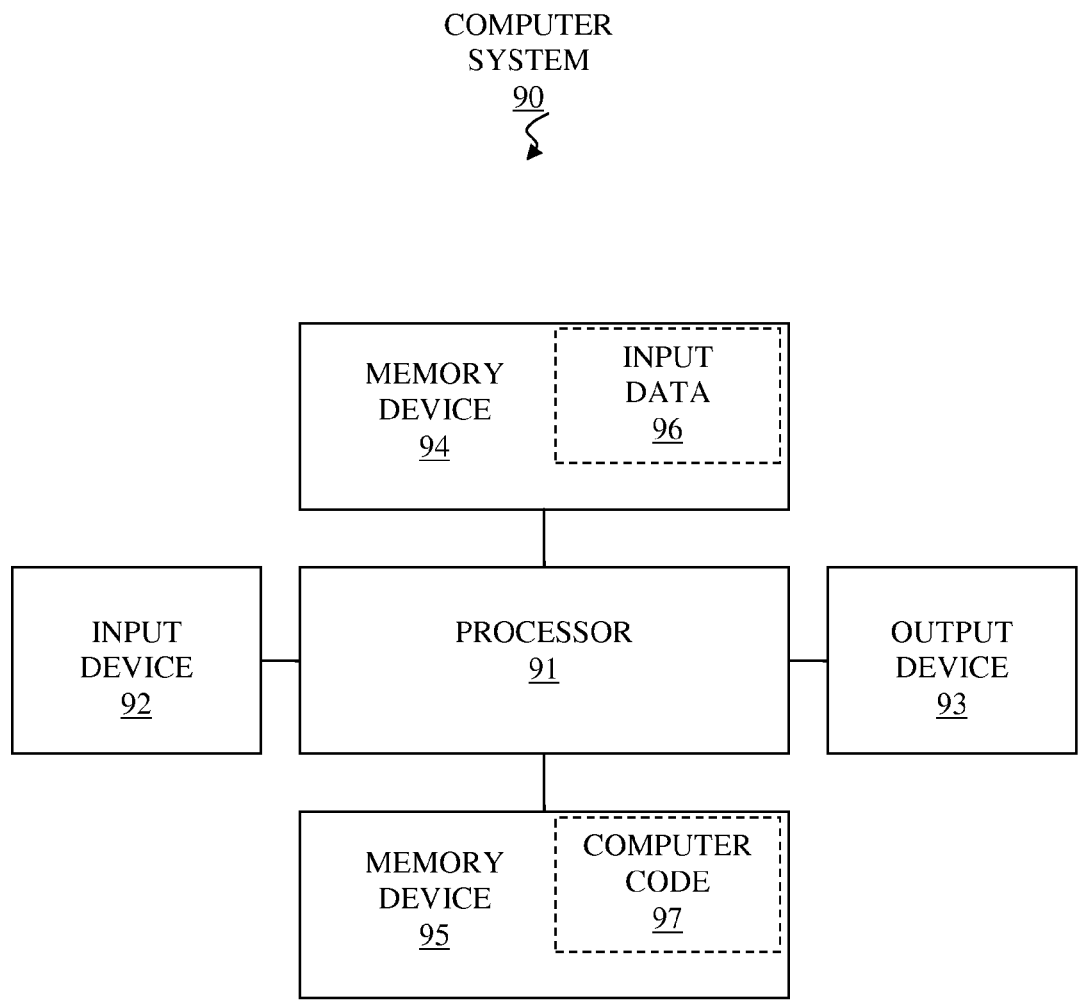
FIG. 3 illustrates a computer system 90 used for synchronizing a record with a web document in a content management system, in accordance with embodiments of the present invention.

In one embodiment, the synchronizer is implemented in the Java programming language and executing on a computer system of FIG. 3, infra, which is communicable with the CMS 102, the web site 101, and the Web 2.0 data repository 150. The content management system 102 is adapted to provide features in implementing the present invention. One of the features includes a HTML Meta tag containing a version key in the live web documents. The live web documents stored in the live web document repository 120 are extended to incorporate an additional HTML Meta tag containing a version key from the published web document when it is made live from the published web documents repository 130.

The synchronizer of the present invention has been embodied in Java code, with a content management system in Lotus Domino to which a view comprising syndication keys, version keys and "live" uniform resource locators (URLs) was added. The synchronizer loads the view via Hypertext Transport Protocol (HTTP). This view is ordered most-recently-updated-first, so the Java code traverses the list in the direction from the end of the list to the beginning of the list. The "live" URLs are used to open HTTP connections to obtain the "live" HTML documents and retrieve the "live" version keys, which are embedded into the HTML documents as HTML "meta" tags. The Web 2.0 data repository comprises tables in DB2 Universal Database (UDB), including a table which includes syndication key and version identifier.

FIG. 3 illustrates a computer system 90 used for synchronizing a record with a web document in a content management system, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for synchronizing a record with a web document in a content management system according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for synchronizing at least one record stored in a data repository with at least one web document stored in a content management system (CMS) repository, the method comprising:
    selecting, by a synchronizer, a web document of said at least one web document from a published web document repository of the CMS repository, wherein the synchronizer is communicable with the data repository, the CMS repository, and a web site comprising a data server and a web document server;
    locating, in the data repository, a record of said at least one record that corresponds to the selected web document, wherein the located record comprises a data field enabling a Web 2.0 service to web users of the selected web document, and wherein a syndication key field of the located record has a first value identical to a syndication key field of the selected web document; and
    determining to update the located record in the data repository in accordance with current content of the selected web document as available to the web users such that the web users utilize the Web 2.0 service within the selected web document by use of the updated record in the data repository.

2. The method of claim 1, said determining comprising:
    ascertaining that a version key field of the selected web document stored in the published web document repository does not have a second value identical to a version key field of the located record stored in the data repository, which indicates that the selected web document has been modified after the located record had been stored in the data repository; and
    verifying that the selected web document is available to the web users by examining a live copy associated with the selected web document, wherein the live copy is stored in a live web document repository of the CMS repository, wherein a syndication key field of the live copy has the first value identical to the syndication key field of the selected web document, wherein a version key field of the live copy has a second value identical to the version key field of the selected web document, and wherein the live copy represents the current content of the selected web document as available to the web users.

3. The method of claim 1, said determining comprising:
    ascertaining that a version key field of the selected web document stored in the published web document repository does not have a second value identical to a version key field of the located record stored in the data repository, which indicates that the selected web document has been modified after the located record had been stored in the data repository;
    discovering that the live copy associated with the selected web document does not exist in the live web document repository, wherein the live copy represents the current content of the selected web document as available to the web users; and
    deleting the located record that corresponds to the selected web document-from the data repository such that each record of said at least one record stored in the data repository corresponds to a respective web document having a respective live copy in the live web document repository that is available to the web users.

4. The method of claim 2, the method further comprising:
    updating the located record in the data repository such that the updated record reflects the current content of the available to the web users of the selected web document in the live web document repository such that the web users utilize the Web 2.0 service within the selected web document by use of the updated record in the data repository, wherein the Web 2.0 service is selected from the group consisting of hit counting, tag clouding, advanced searching, and combinations thereof.

5. The method of claim 1, wherein the synchronizer is configured to select an oldest web document from the published web document repository in said selecting.

6. The method of claim 1, wherein the record of said at least one record stored in the data repository comprises fields used for Asynchronous JavaScript and Extensible Markup Language (AJAX) functions that provides Web 2.0 services in the web document that corresponds to the record, wherein the Web 2.0 services are selected from the group consisting of hit counting, tag clouding, advanced searching, and combinations thereof.

7. The method of claim 1, wherein the synchronizer utilizes Java Data repository Connectivity (JDBC) application programming interfaces (APIs) in accessing the record of said at least one record stored in the data repository, wherein the synchronizer utilizes Hypertext transport protocol (HTTP) connections via Java class libraries in accessing the web document of said at least one web document stored in the content management system (CMS) repository.

8. A computer program product, comprising a computer usable storage medium having a computer readable program code embodied therein, said computer readable program code containing instructions that when executed by a processor of a computer system implement a method for synchronizing at least one record stored in a data repository with at least one web document stored in a content management system (CMS) repository, the method comprising:
    selecting, by a synchronizer, a web document of said at least one web document from a published web document repository of the CMS repository, wherein the synchronizer is communicable with the data repository, the CMS repository, and a web site comprising a data server and a web document server;
    locating, in the data repository, a record of said at least one record that corresponds to the selected web document, wherein the located record comprises a data field enabling a Web 2.0 service to web users of the selected web document, and wherein a syndication key field of the located record has a first value identical to a syndication key field of the selected web document; and determining to update the located record in the data repository in accordance with current content of the selected web document as available to the web users such that the web users utilize the Web 2.0 service within the selected web document by use of the updated record in the data repository.

9. The computer program product of claim 8, said determining comprising:

ascertaining that a version key field of the selected web document stored in the published web document repository does not have a second value identical to a version key field of the located record stored in the data repository, which indicates that the selected web document has been modified after the located record had been stored in the data repository; and verifying that the selected web document is available to the web users by examining a live copy associated with the selected web document, wherein the live copy is stored in a live web document repository of the CMS repository, wherein a syndication key field of the live copy has the first value identical to the syndication key field of the selected web document, wherein a version key field of the live copy has a second value identical to the version key field of the selected web document, and wherein the live copy represents the current content of the selected web document as available to the web users.

10. The computer program product of claim 8, said determining comprising:

ascertaining that a version key field of the selected web document stored in the published web document repository does not have a second value identical to a version key field of the located record stored in the data repository, which indicates that the selected web document has been modified after the located record had been stored in the data repository;

discovering that the live copy associated with the selected web document does not exist in the live web document repository, wherein the live copy represents the current content of the selected web document as available to the web users; and deleting the located record that corresponds to the selected web document-from the data repository such that each record of said at least one record stored in the data repository corresponds to a respective web document having a respective live copy in the live web document repository that is available to the web users.

11. The computer program product of claim 9, the method further comprising:

updating the located record in the data repository such that the updated record reflects the current content of the available to the web users of the selected web document in the live web document repository such that the web users utilize the ervice within the selected web document by use of the updated record in the data repository, wherein the Web 2.0 service is selected from the group consisting of hit counting, tag clouding, advanced searching, and combinations thereof.

12. The computer program product of claim 8, wherein the synchronizer is configured to select an oldest web document from the published web document repository in said selecting.

13. The computer program product of claim 8, wherein the record of said at least one record stored in the data repository comprises fields used for Asynchronous JavaScript and Extensible Markup Language (AJAX) functions that provides Web 2.0 services in the web document that corresponds to the record, wherein the Web 2.0 services are selected from the group consisting of hit counting, tag clouding, advanced searching, and combinations thereof.

14. The computer program product of claim 8, wherein the synchronizer utilizes Java Data repository Connectivity (JDBC) application programming interfaces (APIs) in accessing the record of said at least one record stored in the data repository, wherein the synchronizer utilizes Hypertext transport protocol (HTTP) connections via Java class libraries in accessing the web document of said at least one web document stored in the content management system (CMS) repository.

15. A computer system comprising a processor and a computer readable memory unit coupled to the processor, said memory unit containing instructions that when executed by the processor implement a method for synchronizing at least one record stored in a data repository with at least one web document stored in a content management system (CMS) repository, the method comprising:

selecting, by a synchronizer, a web document of said at least one web document from a published web document repository of the CMS repository, wherein the synchronizer is communicable with the data repository, the CMS repository, and a web site comprising a data server and a web document server;

locating, in the data repository, a record of said at least one record that corresponds to the selected web document, wherein the located record comprises a data field enabling a Web 20 service to web users of the selected web document, and wherein a syndication key field of the located record has a first value identical to a syndication key field of the selected web document; and determining to update the located record in the data repository in accordance with current content of the selected web document as available to the web users such that the web users utilize the Web 2.0 service within the selected web document by use of the updated record in the data repository.

16. The computer system of claim 15, said determining comprising:

ascertaining that a version key field of the selected web document stored in the published web document repository does not have a second value identical to a version key field of the located record stored in the data repository, which indicates that the selected web document has been modified after the located record had been stored in the data repository; and verifying that the selected web document is available to the web users by examining a live copy associated with the selected web document, wherein the live copy is stored in a live web document repository of the CMS repository, wherein a syndication key field of the live copy has the first value identical to the syndication key field of the selected web document, wherein a version key field of the live copy has a second value identical to the version key field of the selected web document, and wherein the live copy represents the current content of the selected web document as available to the web users.

17. The computer system of claim 15, said determining comprising:

ascertaining that a version key field of the selected web document stored in the published web document repository does not have a second value identical to a version key field of the located record stored in the data repository, which indicates that the selected web document has been modified after the located record had been stored in the data repository;

discovering that the live copy associated with the selected web document does not exist in the live web document repository, wherein the live copy represents the current content of the selected web document as available to the web users; and deleting the located record that corresponds to the selected web document-from the data repository such that each record of said at least one record stored in the data repository corresponds to a respective web document having a respective live copy in the live web document repository that is available to the web users.

18. The computer system of claim 16, the method further comprising:

updating the located record in the data repository such that the updated record reflects the current content of the available to the web users of the selected web document in the live web document repository such that the web users utilize the Web 2.0 service within the selected web document by use of the updated record in the data repository, wherein the Web 2.0 service is selected from the group consisting of hit counting, tag clouding, advanced searching, and combinations thereof.

19. The computer system of claim 15, wherein the synchronizer is configured to select an oldest web document from the published web document repository in said selecting.

20. The computer system of claim 15, wherein the record of said at least one record stored in the data repository comprises fields used for Asynchronous JavaScript and Extensible Markup Language (AJAX) functions that provides Web 2.0 services in the web document that corresponds to the record, wherein the Web 2.0 services are selected from the group consisting of hit counting, tag clouding, advanced searching, and combinations thereof, and wherein the synchronizer utilizes Java Data repository Connectivity (JDBC) application programming interfaces (APIs) in accessing the record of said at least one record stored in the data repository, wherein the synchronizer utilizes Hypertext transport protocol (HTTP) connections via Java class libraries in accessing the web document of said at least one web document stored in the content management system (CMS) repository.

* * * * *